(12) United States Patent
Hansmann et al.

(10) Patent No.: US 7,539,778 B2
(45) Date of Patent: May 26, 2009

(54) METHOD FOR A CACHING MECHANISM FOR A CENTRAL SYNCHRONIZATION SERVER

(75) Inventors: Uwe Hansmann, Altdorf (DE); Apratim Purakayastha, Yorktown Heights, NY (US); Stefan Hepper, Tuebingen (DE); Thomas Stober, Boeblingen (DE); Douglas Heintzman, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 786 days.

(21) Appl. No.: 10/480,943

(22) PCT Filed: Jun. 25, 2002

(86) PCT No.: PCT/EP02/06996

§ 371 (c)(1),
(2), (4) Date: Apr. 1, 2004

(87) PCT Pub. No.: WO03/005206

PCT Pub. Date: Jan. 16, 2003

(65) Prior Publication Data

US 2004/0153576 A1    Aug. 5, 2004

(30) Foreign Application Priority Data

Jun. 30, 2001    (EP)    ................................... 01115979

(51) Int. Cl.
*G06F 15/16*    (2006.01)
(52) U.S. Cl. .................. 709/248; 709/224; 709/250
(58) Field of Classification Search ................. 709/248, 709/250, 224, 225, 201
See application file for complete search history.

(56) References Cited

U.S. PATENT DOCUMENTS 6,061,714 A * 5/2000 Housel et al. ............... 709/203
6,341,316 B1 * 1/2002 Kloba et al. ................. 709/248
6,587,921 B2 * 7/2003 Chiu et al. ................... 711/119
6,810,405 B1 * 10/2004 LaRue et al. ................ 707/201
6,862,617 B1 * 3/2005 Wu ............................. 709/224
7,130,882 B1 * 10/2006 Hudis et al. ................. 709/203
7,149,813 B2 * 12/2006 Flanagin et al. ............. 709/248

OTHER PUBLICATIONS

SyncML Sync Protocol Version 1.0.*
Helal, S. et al., "A Three-Tier Architecture For Ubiquitous Data Access", Computer Systems and Applications, ACS/IEEE International Conference, XP010551207, ISBN: 0-7695-1165-1, Jun. 25, 2001, pp. 177-180.
SYNCML Consortium, "SyncML Sync Protocol", Version 1.0, XP002217356, pp. 1-60, Dec. 7, 2000.
SYNCML Representation Protocol, "SyncML Representation Protocol" Version 1.0, XP002217062, pp. 1-104, Dec. 7, 2000.

(Continued)

*Primary Examiner*—Jeffrey Pwu
*Assistant Examiner*—Shaq Taha
(74) *Attorney, Agent, or Firm*—Robert E. Straight, II; Winstead P.C.

(57) ABSTRACT

The present invention discloses a new synchronization architecture for synchronization of data between different clients by using a central synchronization server linked to a Back End data store which additionally provides a cache for permanently buffering incoming updates into a permanent store by assigning an unique cache identifier (ID). Write conflicts between the synchronization server writing new entries to the cache and updates replicated from backend to cache are solved using a blocking mechanism based on the cache IDs, so that the backend updates are blocked as long as incoming updates from the clients having the same cache ID are not completely written into the cache during a synchronization session. The present invention is preferably suited for a synchronization architecture having a high number of clients connected with the central synchronization server as blocking of the Back End data store, and the connection and the transport to the Back End data store are minimized.

2 Claims, 8 Drawing Sheets

OTHER PUBLICATIONS

Butrico, M. et al. "Gold Rush: Mobile Transaction Middleware with Java-Object Replication", Conference on Object-Oriented Technologies, pp. 91-101, Jun. 16, 1997.

Kistler, J. et al. "Disconnected Operation in the Coda File System", ACM Transactions on Computer Systems, vol. 10, No. 1. Feb. 1962, pp. 3-25, New York, US.

* cited by examiner

METHOD FOR A CACHING MECHANISM FOR A CENTRAL SYNCHRONIZATION SERVER

The present invention relates to a method and system for synchronization of data between different clients, and in particular to synchronization of data between mobile clients by using a central synchronization server linked via network with a Back End data store.

Synchronization can be defined as keeping data consistent between different clients, e.g. a Notebook calendar and Personal Digital Assistant (PDA) calendar, and storing at these clients data into different data formats with different identifiers. The synchronization data can also consist of complete computer programs or parts of these programs.

Figure 1:
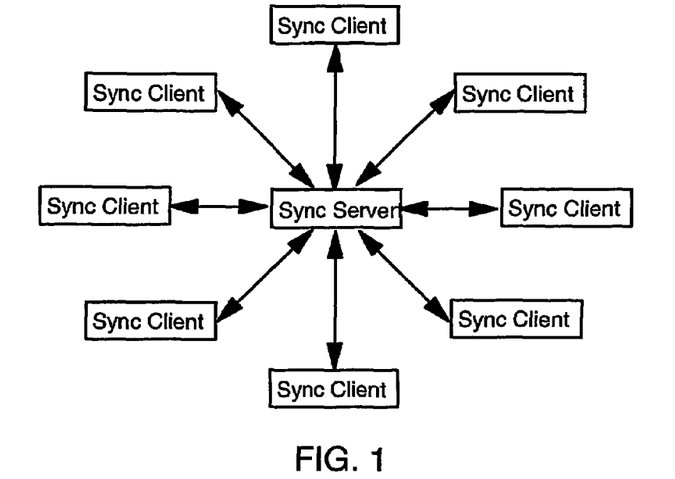
FIG. 1 shows a simplified synchronization architecture on which the present invention may be based.

Frequently, a central synchronization server is used through which data can be exchanged between different clients (see FIG. 1). The central synchronization server can either store all data locally (i.e. when using a proprietary data format), which is normally used by carriers (e.g. Yahoo) with high loads, or can directly access Back End data stores like DB2, Domino, or Exchange (see FIG. 3). The direct access to the Back End data store has the disadvantage that the synchronization process may be very time consuming dependent on the traffic between central synchronization server and Back End data store. This may be very disadvantageously for user of mobile phones because they must pay for the connection time with the Back End data store.

U.S. Pat. No. 5,974,238 describes an apparatus for performing dynamic synchronization between data stored in a handheld computer and a host computer, each having a plurality of data sets including at least one common data set, each computer having a copy of the common data set. The handheld computer has a processor, a communication port, and a data synchronization engine. The data synchronization engine has a pseudo-cache and one or more tags connected to the pseudo cache. Data is synchronized whenever data is written to main memory and/or when the associated pseudo-cache tag is invalidated. By strict adherence to a set of protocols, data coherency is achieved because the system always knows who owns the data, who has a copy of the data, and who has modified the data. The data synchronization engine resolves any differences in the copies and allows the storage of identical copies of the common data set in the host computer and in the handheld computer.

This prior art patent is not directed to a synchronization architecture using a Back End data store. Therefore, the above mentioned problems related to the Back End data store are neither dealt nor solved by that patent.

It is therefore object of the present invention to provide a new method and system for synchronization of data in a synchronization architecture using a central synchronization server linked with to a Back End data store however avoiding the disadvantages of the prior art solutions.

That object is solved by the features of the independent claims. Further preferred embodiments are laid down in the dependent claims.

The present invention discloses a new synchronization architecture for synchronization of data between different clients by using a central synchronization server linked to a Back End data store which additionally provides a cache for permanently buffering incoming updates into a permanent store by assigning an unique cache identifier (ID). Write conflicts between the synchronization server writing new entries to the cache and updates replicated from backend to cache are solved using a blocking mechanism based on the cache IDs, so that the backend updates are blocked as long as incoming updates from the clients having the same cache ID are not completely written into the cache during a synchronization session. In a further preferred embodiment of the present invention a time stamp is additionally assigned to each update by the caching mechanism allowing buffering of updates in the cache only when the time stamp is newer. Updates buffered in the cache may be replicated in different modes by the caching mechanism from and to the Back End data store and the clients, e.g. batch mode or continuous mode. The present invention is preferably suited for a synchronization architecture having a high number of clients connected with the central synchronization server as blocking of the Back End data store, and the connection and the transport to the Back End data store are minimized. Decoupling of the central synchronization server from the Back End data store and using a cache allows to handle higher loads than the direct access to the backend store as the caching mechanism can batch the update requests and send only batches to the Back End data store which is more efficient than contacting the Back End data store for each update request.

The present invention will be described in more detail with the accompanying drawings in which.

Synchronization between different clients using a central synchronization server is based on a synchronization protocol which typically consist of the following steps:

Pre-Synchronization: To prepare the actual synchronization some action must be taken before this can happen. These actions fall into the following groups: authentication, authorization, and determine client capabilities. Authentication ensures that the server is who it claims to be, and that the client is, who it claims to be. Authorization checks, whether the client is allowed to perform the requested action (e.g. delete, update, or only create new entries). Finally the server determines the device capabilities (e.g. maximum buffer size) to optimize the data flow to the client.

Synchronization: This is the part, where the synchronization data is exchanged. Between two synchronization partners all local IDs of data entries are mapped to global IDs known to both partners. Every partner therefore has a mapping table, to map local to global IDs. Then only the updated, new or deleted entries are exchanged. If both partners update the same data entry there will be a conflict. This update conflict can be resolved in different ways: try to merge the updates, duplicate the entries, let one entry win over the other, or simply do nothing and report the conflict so that the user can solve it.

Post-synchronization: At post-synchronization all the cleanup tasks are performed, like updating the mapping tables, report unresolved conflicts, and so on.

Figure 2:
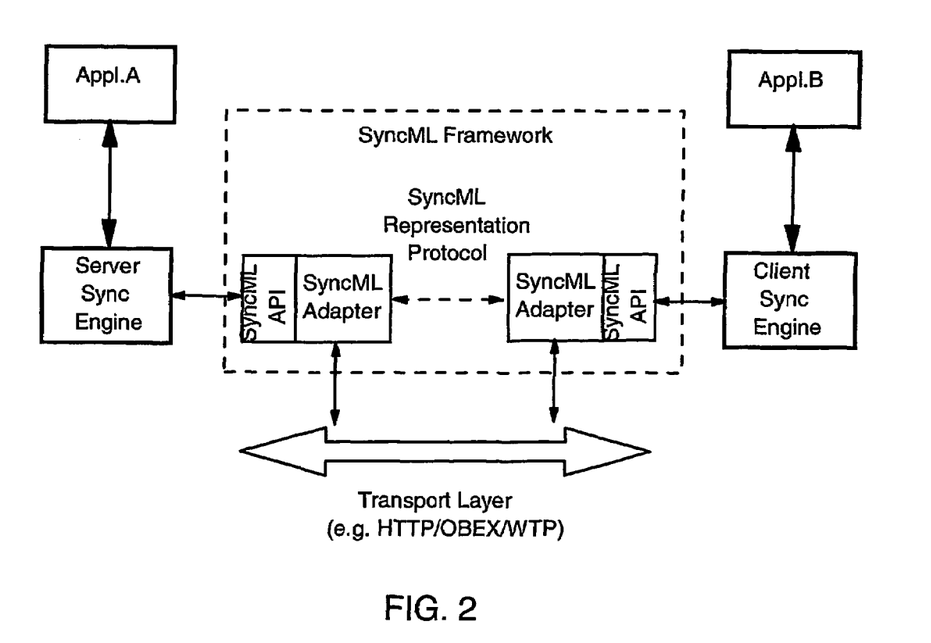
FIG. 2 shows the SyncML communication protocol which may be preferably implemented by the present invention.

A widely used synchronization protocol is SyncML. SyncML provides an XML-based transport protocol for synchronization that is independent of the transport protocol. Each synchronization Message is a XML-document. A typical SyncML system is shown in FIG. 2 where Application B (e.g. Personal Digital Assistant) is sending synchronization data via its Client Sync Engine to the SyncML Framework. The SyncML Framework translates the API calls (e.g. Update, Create, . . . ) and the data into a valid SyncML document and sends it to the Server. On the Server side the SyncML Framework receives the document, parses it, and then sends the command and data to the Server Sync Engine, which then talks to the Application A (e.g. Lotus Notes Calendar of a notebook).

Figure 3:
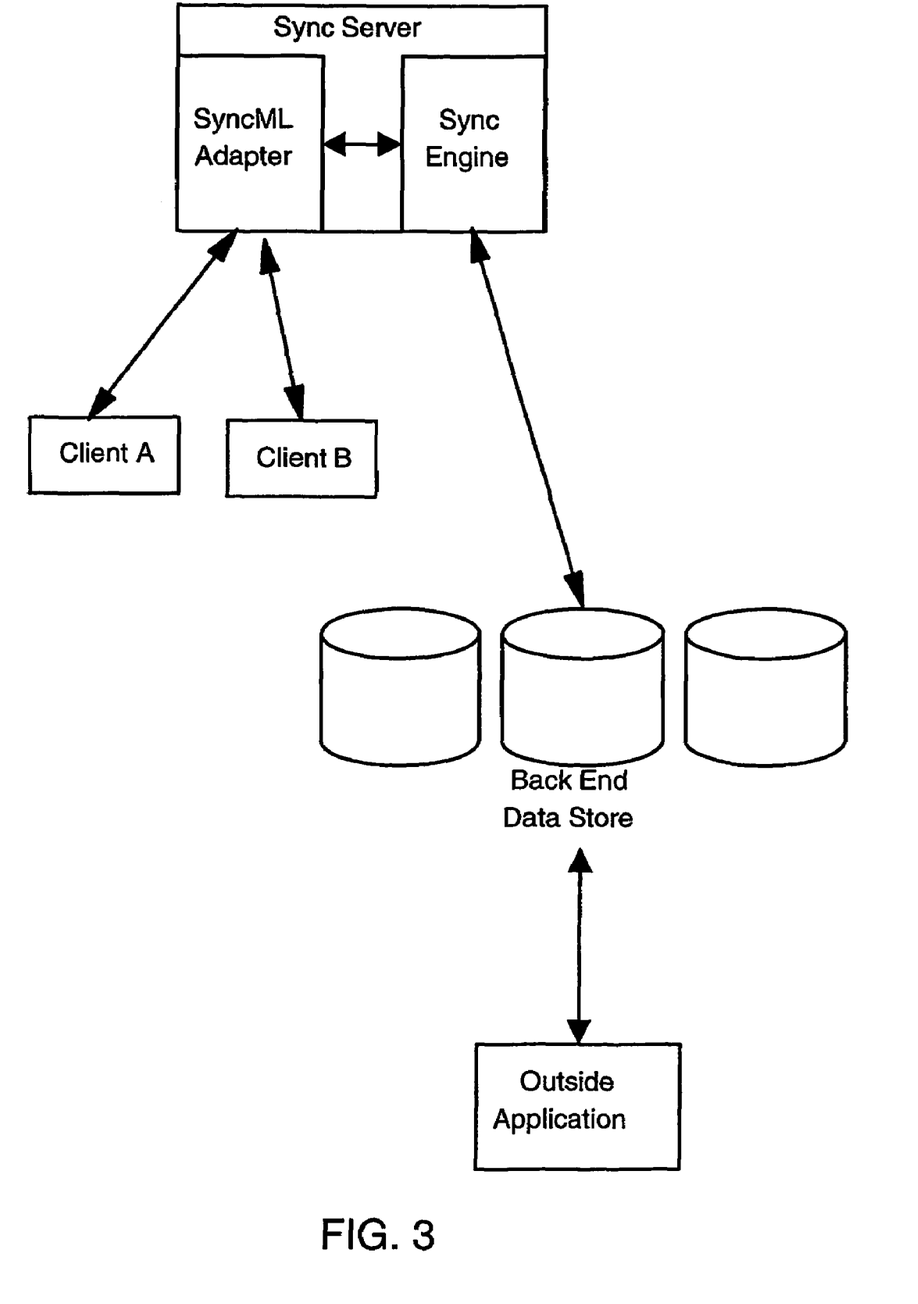
FIG. 3 shows the prior art synchronization architecture with direct access to the Back End data store.
Figure 4:
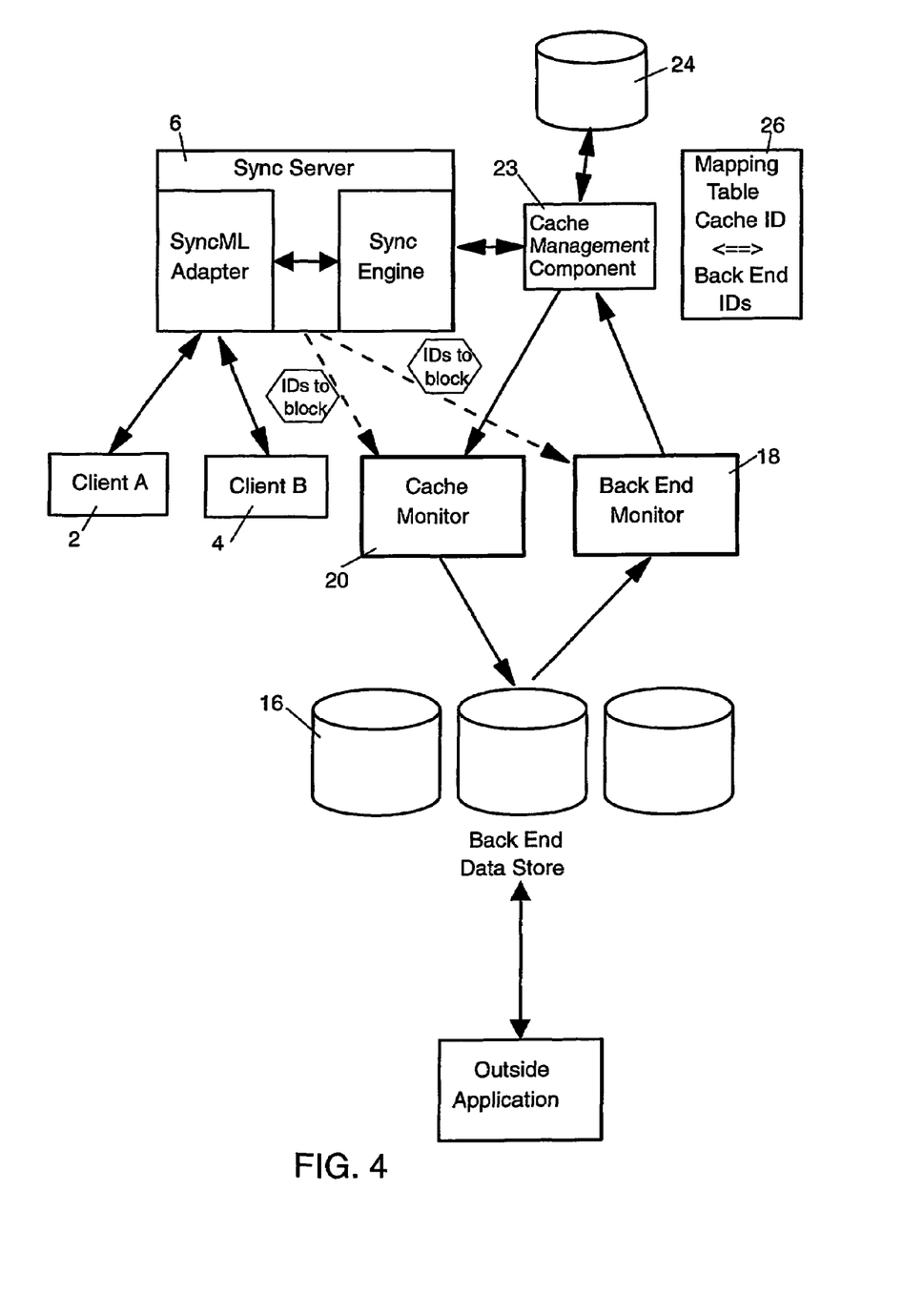
FIG. 4 shows the synchronization architecture using the inventive caching mechanism.

In FIG. 3 a prior art synchronization architecture having direct access to the Back End data store is shown. Clients A and B which may be mobile clients (e.g. mobile phone or personal digital assistant) having a wired or wireless connection with a central synchronization server (SynchServer especially SyncEngine). Updates or new entries from the mobile clients are sent to the SyncEngine via the SynML adapter. The central synchronization server reads and writes updates directly to the Back End data store. Communication between central synchronization server and Back End data store can either be Java JDBC calls, ODBC calls, SOAP or HTTP requests or proprietary communication protocols. The Back End data store may be a relational database like Oracle or IBM DB2 or a non-relational data store like Microsoft Exchange or Lotus Domino. The Back End data store is connected with the central synchronization server by Intranet or Internet. This may result in a bottleneck in the following cases:

Slow connection to the Back End data store
Read/write are slow operations on the Back End data store
Back End data store does not scale well
Back End data store does not support fine-grained blocking of data records or blocks In FIG. 4 the basic inventive synchronization architecture is shown. Compared with the prior art synchronization architecture (see FIG. 3) the present invention basically provides a permanent cache 24 and a caching mechanism for buffering of updates into the cache 24 and synchronizing buffered updates with the respective clients 2,4. The permanent cache 24 may be a relational data base like Oracle or IBM DB2 and may be accessed for example via JDBC calls. The caching mechanism preferably consists of a cache monitor 20, a backend monitor 18 and cache management component 23. The cache monitor 20 controls the replication of client updates from the cache to the Back End data store 16. The backend monitor 18 controls replication of backend updates from the Back End data store to the cache 24. The cache management component 23 provides interfaces to the central synchronization server 6 (sync server), cache monitor 20 and backend monitor 18 for accessing the buffered updates. The cache management component 23 also provides creation of cache IDs and mapping cache IDs to backend IDs and vice versa. When the central synchronization server 6 is writing updates into the cache 24, the cache monitor 20 as well as the backend monitor 18 receive a message containing at least a cache ID assigned to the update to be buffered. By means of a mapping table 26 containing backend IDs and assigned cache IDs the backend monitor 18 blocks buffering of each incoming update from the Back End data store into the cache 24 as long as updates from the clients having the same cache IDs are not completely buffered in the cache 24. The synchronization process which preferably initiated by the central synchronization server is opened by a synchronization start call (beginsync) to the cache monitor 20 and closed by synchronization end call (endsync) to the cache monitor 20. During that synchronization session the cache monitor 20 does not allow replication of updates with cache IDs of the beginsyncall buffered in the cache 24.

Figure 5:
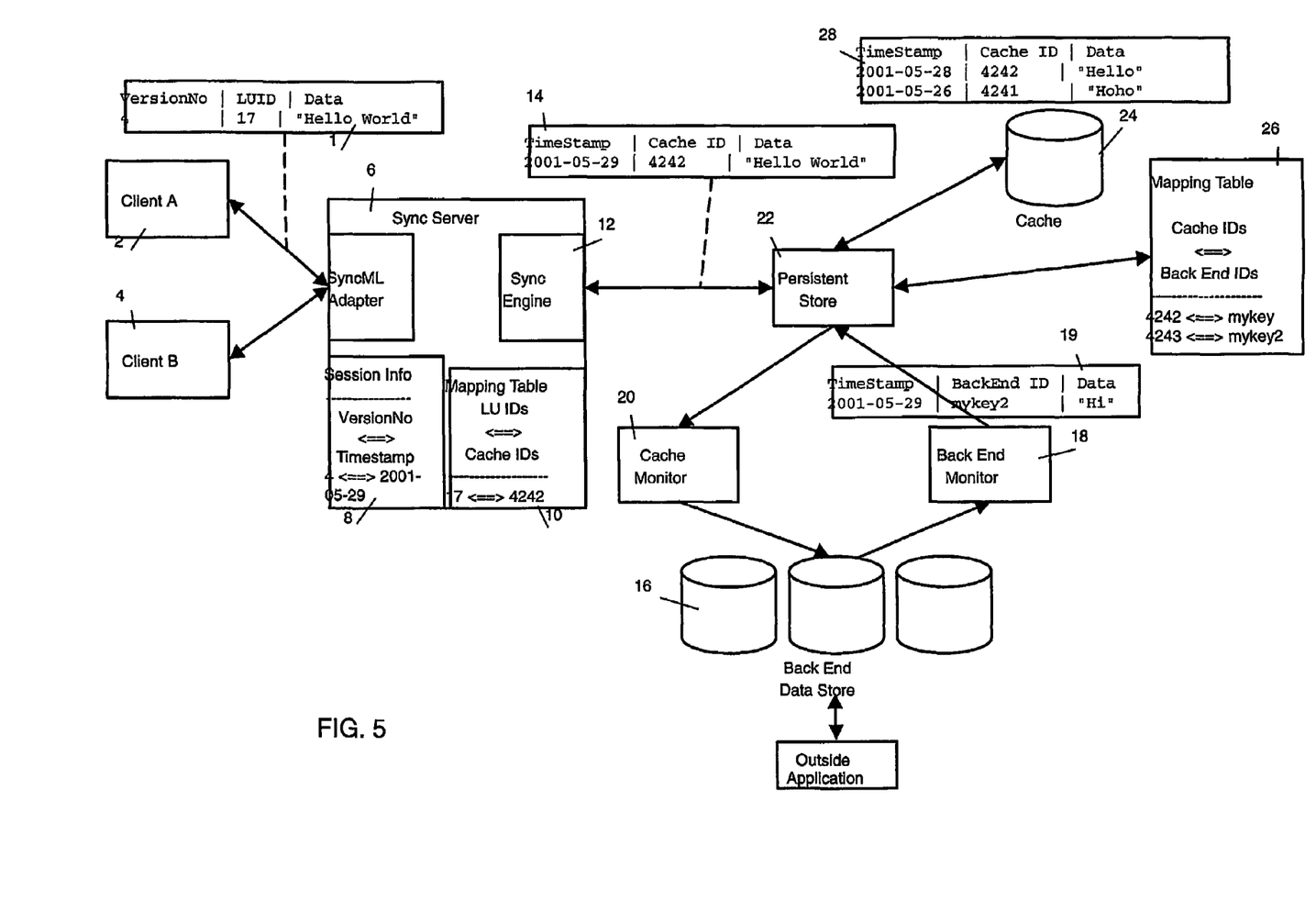
FIG. 5 shows a preferred embodiment of the inventive synchronization architecture as shown in FIG. 4 using a caching mechanism with providing of time stamps.

FIG. 5 shows a further preferred embodiment of the present invention. Compared with the basic synchronization architecture as shown in FIG. 4 this preferred embodiment further includes a Persistent store 22. The Persistent store 22 replaces the cache management component 23 in FIG. 4 and provides mapping 26 between backend IDs and Cache IDs and secures that only updates having a newer time stamp are written into the cache 24. For example the client A 2 opens a synchronization session with the central synchronization server 6 (sync server) and sends an update 1 including at least Local Universal Identifier (LUID), a version number and the data to be updated. The LUID identifies the data record on the client data store uniquely. The central synchronization server 6 has a mapping table 10 for mapping client's LIUDs (including client ID and data base URI) to cache IDs for identifying the update request on the cache 24. As time stamp the client is using an incremental counter as many mobile clients 2,4 do not support time stamps in their data store. The synchronization engine 12 (SyncEngine) part of the synchronization server 6 knows to map 8 the version number of updates to a synchronization session time stamp. The synchronization engine 12 is sending the update with the synchronization session time stamp and the cache ID to the persistent store 22. The persistent store 22 compares the time stamp of the update with time stamps of updates in the cache. If the time stamp of the update request is newer the update request is then buffered in the cache 24. If the update request is not newer then it is ignored. At the same time an update in the Back End data store 16 occurred and the backend monitor 18 is calling the persistent store 22 with an update 19 including a time stamp, a backend ID, and data to be updated. The persistent store 22 maps the backend ID to the assigned cache ID, compares the time stamps, and updates the cache 24 if the time of the incoming update is newer. The result of these two updates is shown in FIG. 6.

Figure 6:
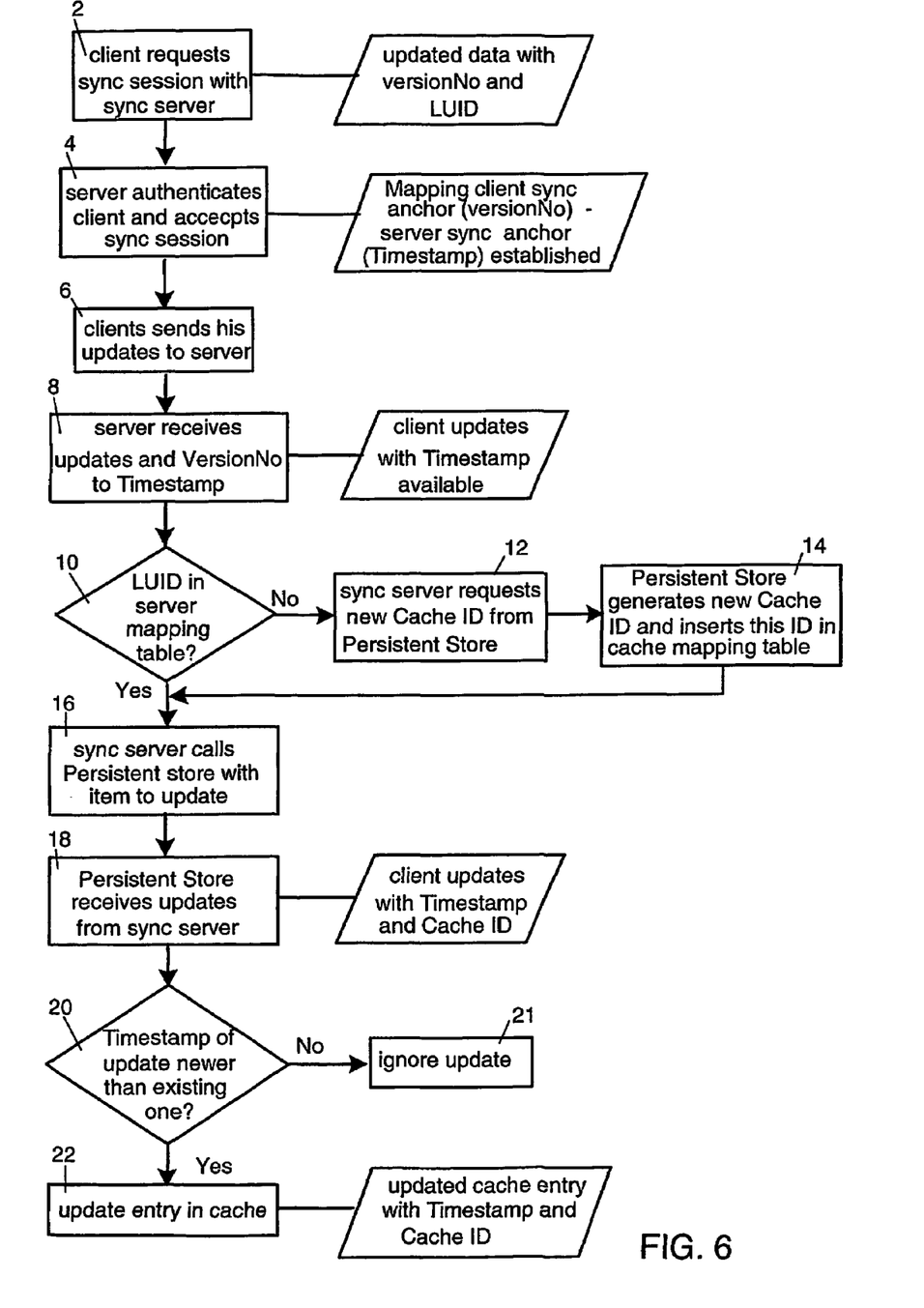
FIG. 6 shows the method steps for synchronization of updates between clients via the central synchronization server to the cache.

FIG. 6 shows the inventive method steps how updates from client are synchronized via the central synchronization server with data in the cache.

The client, e.g. mobile phone, requests 2 a synchronization session with the synchronization server (sync server). Before the update can be sent to the central synchronization server an authentication between client and central synchronization server has to be accomplished. If the authentication is successful 4 then central synchronization server accepts synchronization process and the client may send its update 6.

The update preferably contains a version number, a LUID and the data to be updated. The central synchronization server receives 8 the update and converts the version number into an assigned time stamp by using a mapping table. In the next step the LUID of the update is mapped 10 with the mapping table containing LUIDS and their assigned cache IDs. If the LUID is not contained 12 in the cache mapping table the persistent store creates 14 a new cache ID and updates the mapping table with it. If the LUID is already contained in the cache mapping table the central synchronization server calls 16 the persistent store for buffering an update in the cache. The persistent store then examines 18,20 the time stamp of that incoming update with the time stamp of a buffered update in the cache having the same cache ID. If the time stamp of the incoming update is newer then the incoming update overwrites 22 the older update in the cache. If the time stamp is older then the incoming update is ignored 21.

Figure 7:
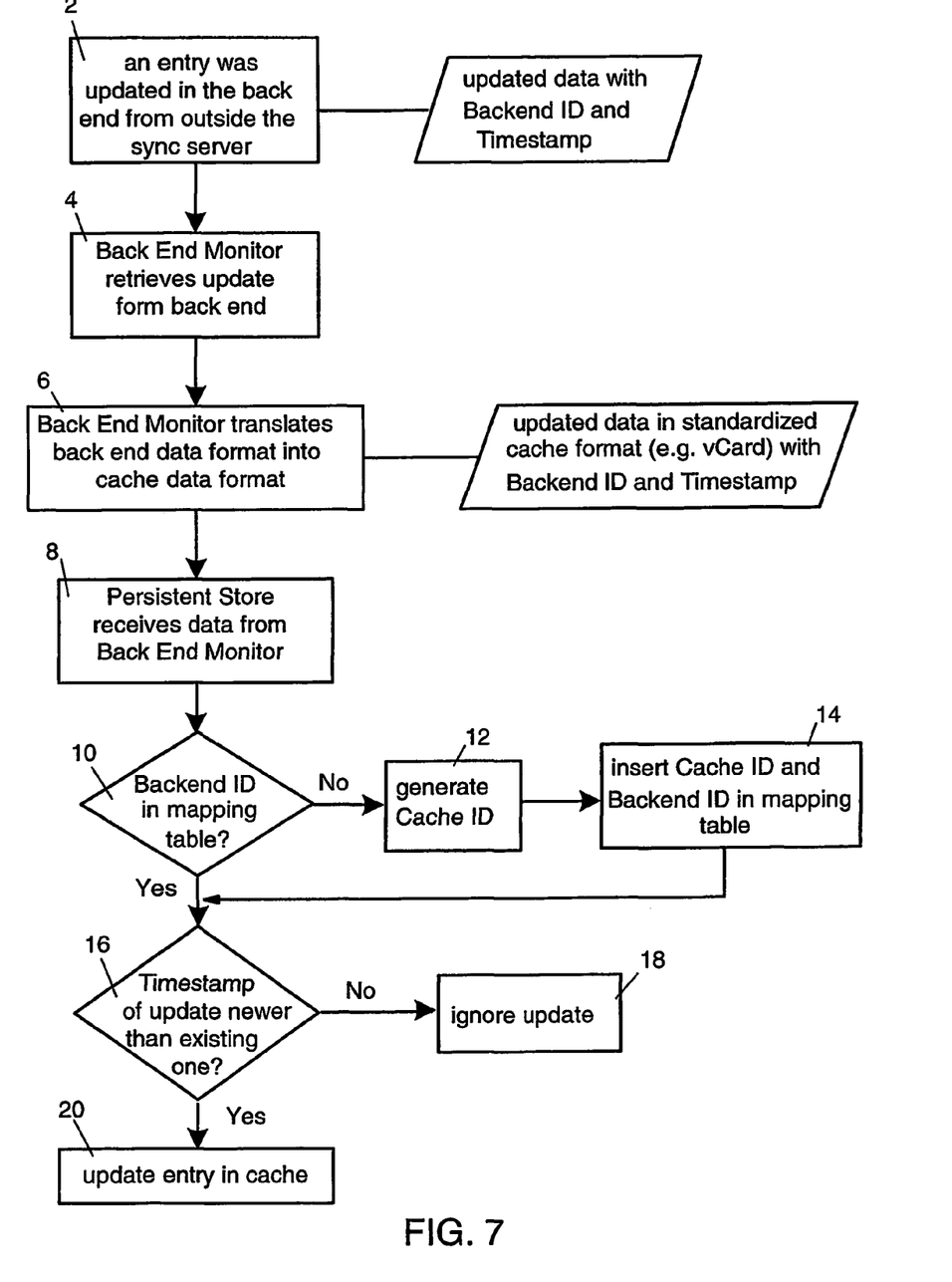
FIG. 7 shows the method steps for replicating of updates of Back End data store with the cache.

FIG. 7 shows the method steps how updates from Back End data store are replicated in the cache. Assuming an entry was updated in the Back End data store by an application having access to the Back End data store, for example a secretary may create an update of calendar data of her manager in the Back End data store. Each update of an entry contains the backend ID, the time stamp and data to be updated. The update may be sent to the backend monitor by the following models:

Back End data store notifies the backend monitor about each new entry or update. The backend monitor initiates read requests for receiving the update. This model is called the push model, or the backend monitor periodically starts a query to the Back End data store. The Back End data store returns backend IDS of updates or new entries. By means of the backend IDs the backend monitor initiates an access to those updates. This model is called polling model.

The backend monitor retrieves the update from the backend and translates the backend data format into a cache data format including backend ID and time stamp 4,6. The backend monitor sends 8 updates to the persistent store that maps the backend IDS to assigned cache IDs by using a mapping table. If the backend ID is not contained in the mapping table the persistent store creates a new cache ID 12 and inserts new cache ID with assigned backend ID into the mapping table 14. The persistent store then examines the time stamp of that incoming update with the time stamp of an existing update in the cache if available.

If the incoming time stamp is newer then the update in the cache is overwritten 20. If the time stamp is older then the incoming update is ignored 18.

Figure 8:
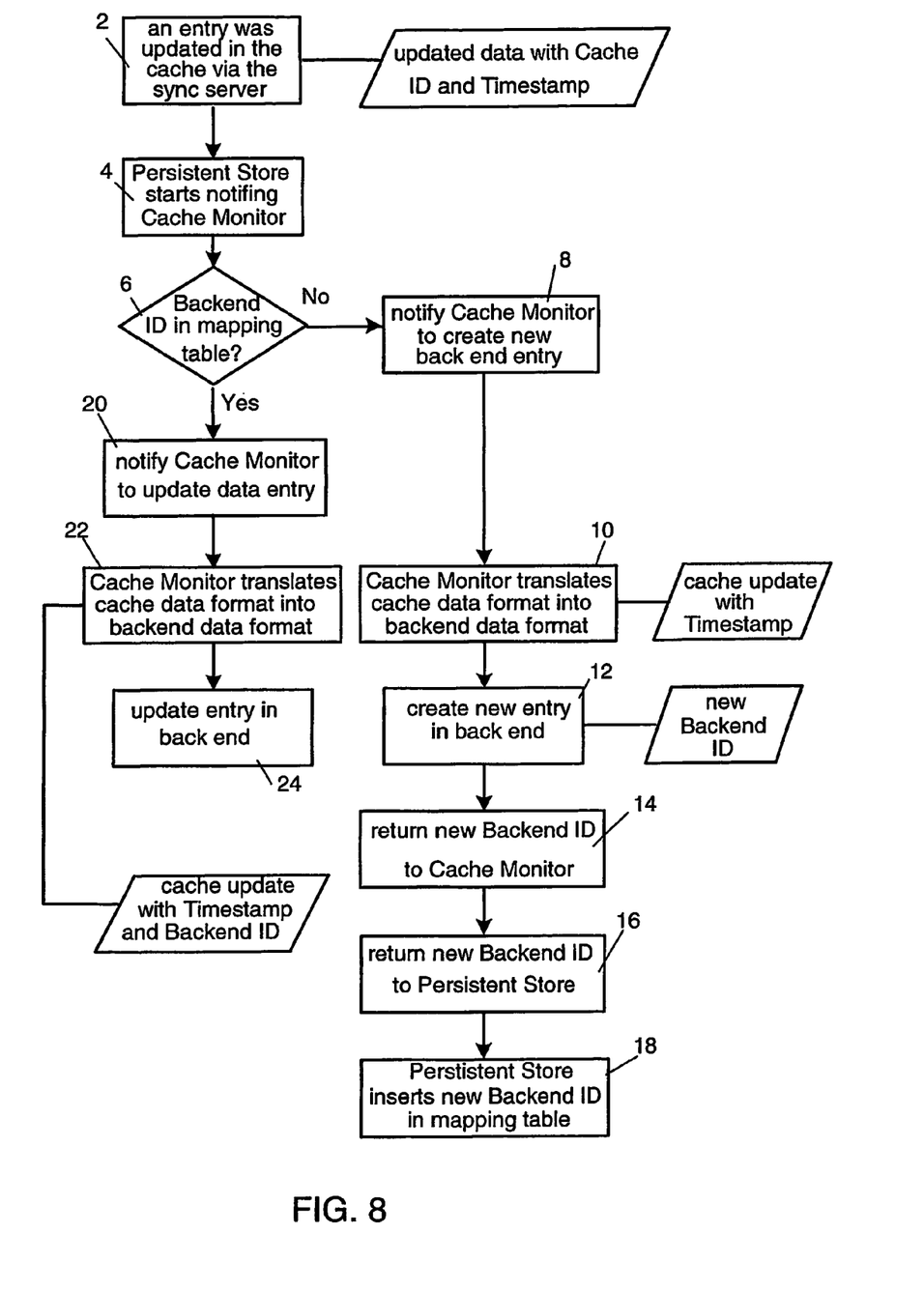
FIG. 8 shows the method steps for replication of updates occurred in the cache with the Back End data store.

FIG. 8 shows the method steps how updates that occurred in the cache are replicated in the Back End data store via the synchronization server (sync server). An entry was updated in the cache according to the method steps as shown in FIG. 6. The Persistent store now notifies 4 the cache monitor about a new entry in the cache. Cache monitor uses 6 the mapping table for selecting assigned Backend ID to the cache ID of the new entry. If the cache ID has no assigned Backend ID in the mapping table the cache monitor is initiated 8 to create a new backend entry. At first the cache monitor translates 10 the cache data containing time stamp and entry data into the data format of the backend system, establish connection with the Back End data store and then creates 12 a new entry in the Back End data store containing time stamp, update data and backend ID. The new backend ID is forwarded 14 via the cache monitor to the persistent store 16 that inserts 18 the new backend ID into the mapping table containing cache IDs and their assigned Backend IDs. If the cache ID has an assigned Backend ID in the mapping table the cache monitor is notified 20 to initiate the update entry in the backend. The cache monitor translates 22 the cache data format of the update entry into backend data format and the update entry containing time stamp and Backend ID is executed 24 in the backend store.

Figure 9:
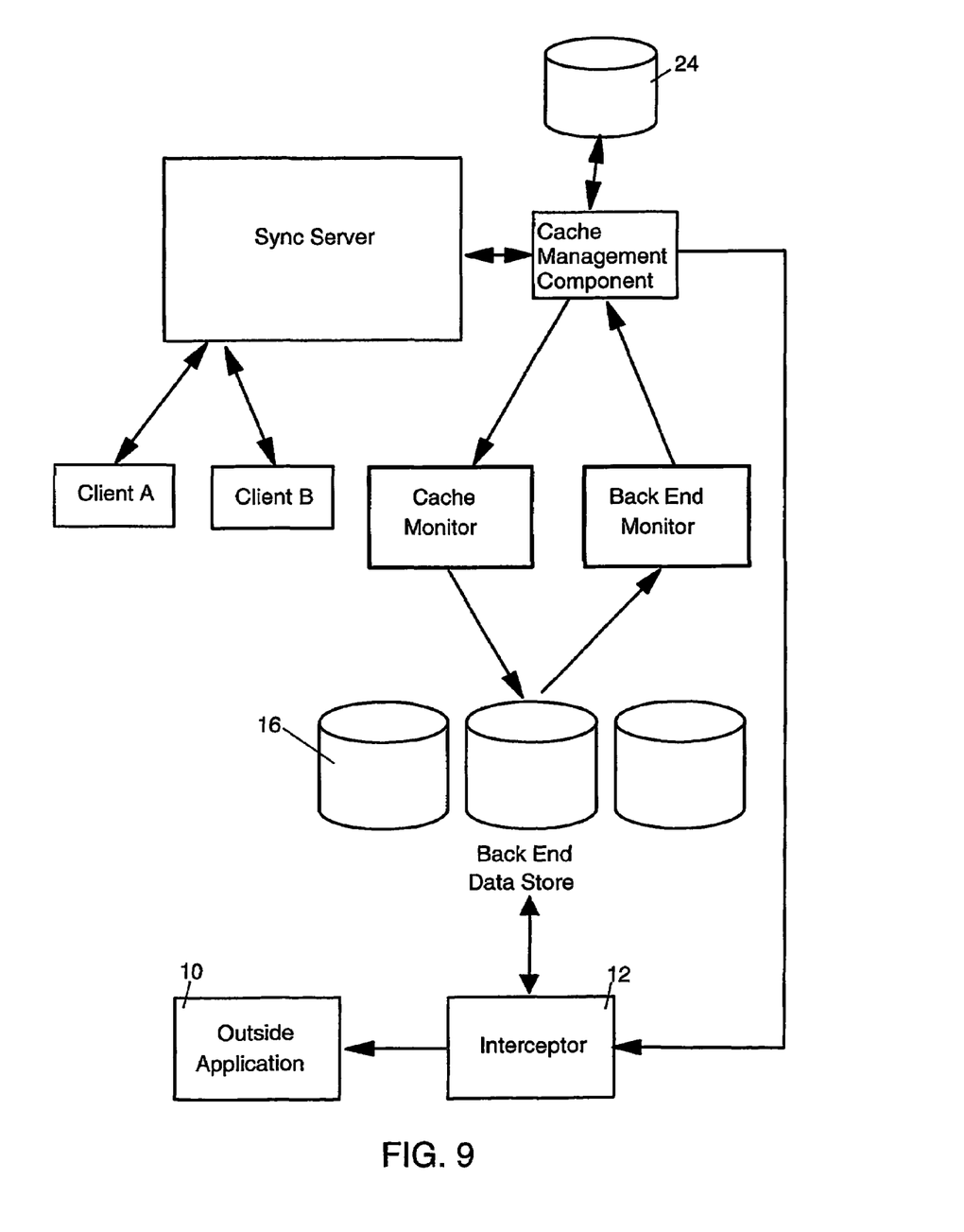
FIG. 9 shows the inventive extended caching mechanism.

FIG. 9 shows the extended caching mechanism. The outside application 10 now accesses the Back End data store 16 via an interceptor 12. The interceptor 12 knows about the synchronization server cache 24 and first looks into that cache before retrieving data from the Back End data store 16. This solves the read-write conflict, but of course the trade-off is a lower performance from the point of view of the outside application.

In summary, the advantages of the present invention compared with the closest prior art are as follows:

Every change on the Back End data store is replicated immediately to the cache. The synchronization server is not blocked when cache replication occurs. Neither cache nor Back End data store updates are completely blocked when the synchronization server is writing to the cache. Cache updates strategy and Backend update strategy can be fine-tuned for the actual usage scenario to achieve the highest performance, e.g. batch or trickle mode.

If needed, read-write-conflict for outside applications can be solved by using an interceptor.

The invention claimed is:

1. A method for replication an update from a Back End data store to a cache comprising the steps of:
   receiving an update from said Back End data store by a central synchronization server containing update data, time stamp, and backend ID,
   translating backend data format of a backend update into cache data format,
   mapping backend ID to cache ID by using a mapping table, and
   buffering of said update from said Back End data store into said cache only when the time stamp is newer than the time stamp of an update buffered in said cache having the same cache ID;
   wherein buffering of updates from said Back End data store into said cache are blocked as long as updates from clients having the same cache IDs are not completely written into said cache during a synchronization session.

2. Method according to claim 1, comprising the further step:
   generating a new cache ID when mapping backend ID to cache ID is not successful, and
   inserting said new cache ID into the mapping table.

* * * * *